(12) United States Patent
Boguraev et al.

(10) Patent No.: US 9,720,981 B1
(45) Date of Patent: Aug. 1, 2017

(54) MULTIPLE INSTANCE MACHINE LEARNING FOR QUESTION ANSWERING SYSTEMS

(71) Applicant: International Business Machines Corporation, Armonk, NY (US)

(72) Inventors: Branimir K. Boguraev, Bedford, NY (US); Bharath Dandala, Austin, TX (US); Benjamin P. Segal, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/053,808

(22) Filed: Feb. 25, 2016

(51) Int. Cl.
*G06F 17/30* (2006.01)
(52) U.S. Cl.
CPC .... *G06F 17/3053* (2013.01); *G06F 17/30392* (2013.01); *G06F 17/30401* (2013.01);
(Continued)
(58) Field of Classification Search
CPC ......... G06F 17/30722; G06F 17/20675; G06F 17/30654; G06F 17/30684;
(Continued)

(56) References Cited

U.S. PATENT DOCUMENTS 5,519,608 A * 5/1996 Kupiec ............... G06F 17/3064
704/9
5,802,493 A * 9/1998 Sheflott ................... G06F 17/30
705/1.1

(Continued)

FOREIGN PATENT DOCUMENTS

WO WO 2009/143395 A1 11/2009
WO WO 2014/177301 * 11/2014

OTHER PUBLICATIONS

Jie Shen et al., "A rank-based Prediction Algorithm of Learning Users Intention", 2012 International Conference on Applied Physics and Industrial Engineering, Physics Procedia 24 (2012) 1742-1748.*

(Continued)

*Primary Examiner* — Srirama Channavajjala
(74) *Attorney, Agent, or Firm* — Stephen R. Tkacs; Stephen J. Walder, Jr.; Diana R. Gerhardt

(57) ABSTRACT

A mechanism is provided in a data processing system for question answering using multi-instance learning. The mechanism trains an answer ranking multi-instance learned model using a ground truth question and answer-key pairs set. When used for answering questions, the mechanism receives an input question from a user and generates one or more candidate answers to the input question. Each of the one or more candidate answers has an associated set of supporting passages. The mechanism determines a confidence value for each of the one or more candidate answers using an answer ranking multi-instance learned model based on the sets of supporting passages. The mechanism ranks the one or more candidate answers by confidence value to form a ranked set of answers, classifies supporting passages to identify the ones which truly support the answer, and presents a final answer from the ranked set of answers, the confidence value for the final answer, and supporting evidence for the final answer to the user.

20 Claims, 5 Drawing Sheets

(52) U.S. Cl.
CPC .. *G06F 17/30554* (2013.01); *G06F 17/30654* (2013.01); *G06F 17/30743* (2013.01)

(58) Field of Classification Search
CPC ........... G06F 17/30598; G06F 17/3069; G06F 17/3053; G06F 17/30424; G06F 17/274; G06F 17/26; G06F 17/2785; G06F 17/2795; G06F 17/2705; G06F 17/30386; G06F 17/30392; G06F 17/30401; G06F 17/30743; G06F 19/363; G06N 99/005; G06N 5/003; G06N 5/02

See application file for complete search history.

(56) References Cited

U.S. PATENT DOCUMENTS

| | | | | |
|---|---|---|---|---|
| 8,275,803 | B2* | 9/2012 | Brown | G06F 17/30654 705/14.44 |
| 8,332,394 | B2* | 12/2012 | Fan | G06F 17/30654 707/723 |
| 8,819,007 | B2* | 8/2014 | Brown | G06F 17/30654 706/12 |
| 8,898,159 | B2* | 11/2014 | Brown | G06F 17/30654 706/12 |
| 9,230,009 | B2* | 1/2016 | Alkov | G06F 17/30598 |
| 9,317,586 | B2* | 4/2016 | Chu-Carroll | G06F 17/30654 |
| 9,348,893 | B2* | 5/2016 | Brown | G06F 17/30654 |
| 9,471,623 | B2* | 10/2016 | Kozloski | G06F 17/2785 |
| 2001/0032211 | A1* | 10/2001 | Kuzumaki | G06F 17/30722 |
| 2002/0029157 | A1* | 3/2002 | Marchosky | G06F 19/322 705/3 |
| 2004/0110120 | A1* | 6/2004 | Ho | G09B 5/00 434/350 |
| 2005/0060222 | A1* | 3/2005 | White | G06Q 10/06 705/7.32 |
| 2006/0277165 | A1* | 12/2006 | Yoshimura | G06F 17/30684 |
| 2006/0286530 | A1* | 12/2006 | Forrest | G09B 7/02 434/323 |
| 2009/0198654 | A1 | 8/2009 | Surendran et al. | |
| 2009/0287678 | A1 | 11/2009 | Brown et al. | |
| 2009/0292687 | A1* | 11/2009 | Fan | G06F 17/30654 |
| 2009/0310854 | A1 | 12/2009 | Mei et al. | |
| 2010/0191686 | A1* | 7/2010 | Wang | G06F 17/30634 706/46 |
| 2011/0066587 | A1 | 3/2011 | Ferrucci et al. | |
| 2011/0125734 | A1* | 5/2011 | Duboue | G09B 7/00 707/723 |
| 2012/0123976 | A1 | 5/2012 | Wang et al. | |
| 2013/0007055 | A1* | 1/2013 | Brown | G06F 17/30654 707/769 |
| 2013/0018652 | A1 | 1/2013 | Ferrucci et al. | |
| 2013/0066886 | A1 | 3/2013 | Bagchi et al. | |
| 2013/0170739 | A1 | 7/2013 | Hosoi | |
| 2013/0238313 | A1* | 9/2013 | Alshinnawi | G06F 17/2795 704/9 |
| 2014/0163962 | A1 | 6/2014 | Castelli et al. | |
| 2014/0172755 | A1 | 6/2014 | Dubbels et al. | |
| 2014/0223284 | A1 | 8/2014 | Rankin, Jr. et al. | |
| 2015/0026106 | A1 | 1/2015 | Oh et al. | |
| 2015/0100521 | A1* | 4/2015 | Kozloski | G06F 17/2785 706/11 |

OTHER PUBLICATIONS

Huan Sun et al., "Table Cell Search for Question Answering", WWW 2016, Apr. 11-15, 2016, pp. 1-12.*
Lucian Vlad Lita et al., Carnegie Mellon University, "Instance-based question answering:A data-driven approach", school of computer science, Research showcase@CMU, Jul. 2004, pp. 1-9.*
U.S. Appl. No. 61/817,268, filed Apr. 29, 2013.*
Xin-Jing Wang et al., "Ranking Community Answers by Modeling Question-Answer Relationships via Analogical Reasoning", SIGIR'09, Jul. 19-23, 2009, Boston, Massachusetts, USA., pp. 179-186.*
Agarwal, Arvind et al., "Learning to Rank for Robust Question Answering", ACM, Proceedings of the 21st ACM International Conference on Information and Knowledge Management (CIKM'12), Maui, HI, Oct. 29-Nov. 2, 2012, 10 pages.
Amores, Jaume, "Multiple Instance Classification: review, taxonomy and comparative study", Elsevier, Artificial Intelligence, vol. 201, Aug. 2013, pp. 81-105.
Andrews, Stuart et al., "Support Vector Machines for Multiple-Instance Learning", Morgan Kaufmann Publishers, Advances in Neural Information Processing Systems 15: Proceedings of the 2002 Conference, Sep. 2003, pp. 577-584.
Babenko, Boris, "Multiple Instance Learning: Algorithms and Applications", University of California at San Diego, http://vision.ucsd.edu/~bbabenko/data/bbabenko_re.pdf, Dept. of Computer Science and Engineering, Technical Report, (month unknown) 2009, 19 pages.
Gondek, D.C. et al., "A framework for merging and ranking of answers in DeepQA", IBM J. Res, & Dev., vol. 56, No. 3/4, Paper 14, May/Jul. 2012, pp. 14:1-14:12.
High, Rob, "The Era of Cognitive Systems: An Inside Look at IBM Watson and How it Works", IBM Corporation, Redbooks, Dec. 12, 2012, 16 pages.
McCord, M.C. et al., "Deep parsing in Watson", IBM J. Res. & Dev. vol. 56 No. 3/4 Paper 3, May/Jul. 2012, pp. 3:1-3:15.
Vijayanarasimhan, Sudheendra et al., "Keywords to Visual Categories: Multiple-Instance Learning for Weakly Supervised Object Categorization", IEEE, Proceedings of the IEEE Conference on Computer Vision and Pattern Recognition, Jun. 2008, 8 pages.
Yang, Jun, "Review of Multi-Instance Learning and Its applications", Carnegie Mellon University, http://www.cs.cmu.edu/~juny/MILL/review.htm, School of Computer Science, Technicai Report, (month unknown) 2005, 7 pages.
Yuan, Michael J. , "Watson and Healthcare. How natural language processing and semantic search could revolutionize clinical decision support", IBM Corporation, developerWorks, http://www.ibm.com/developerworks/industry/library/ind-watson/, Apr. 12, 2011, pp. 1-14.

* cited by examiner

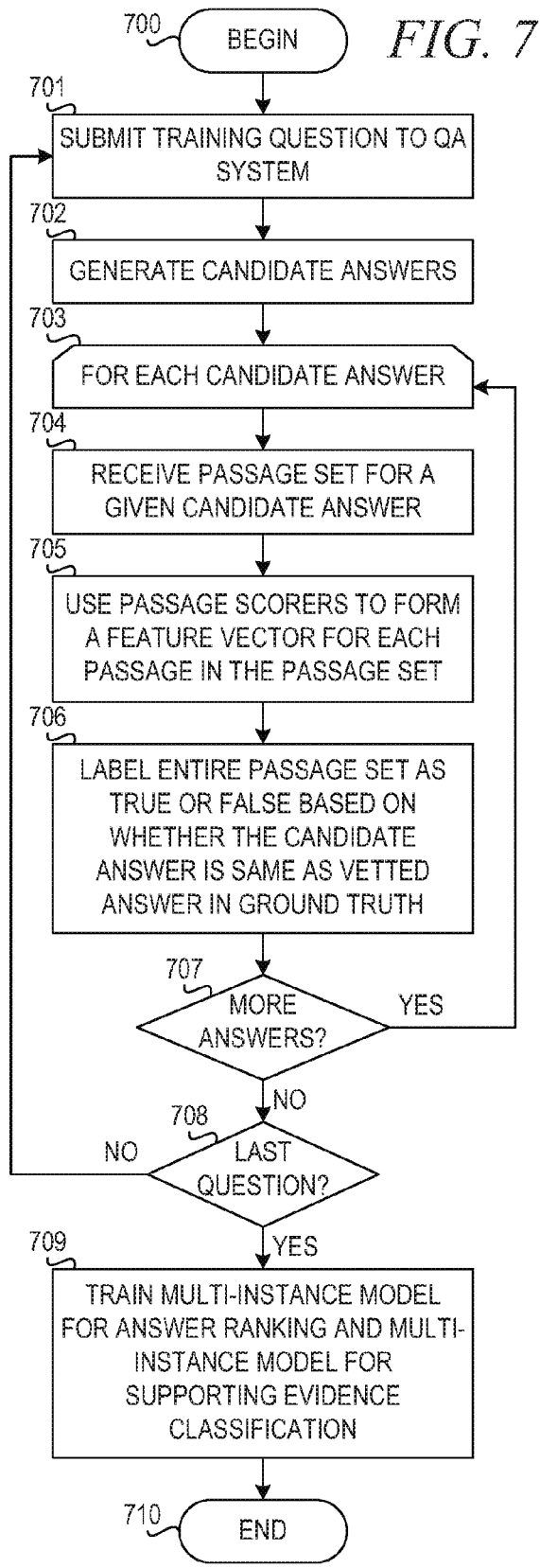

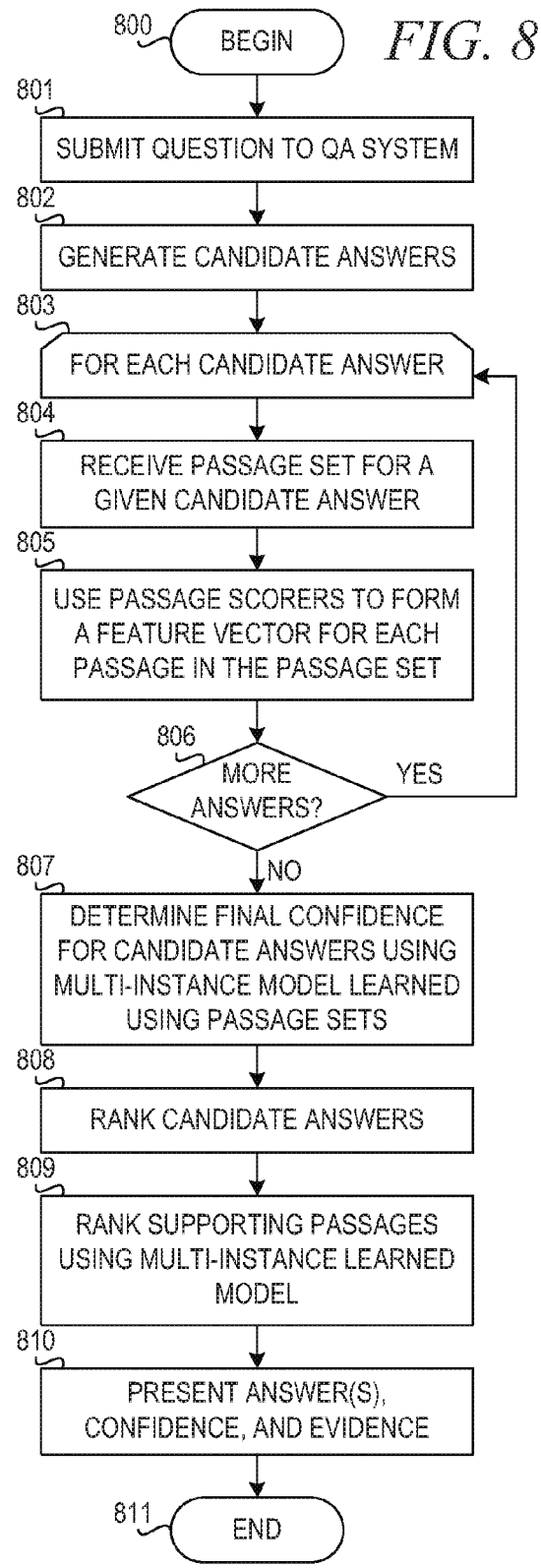

US 9,720,981 B1

MULTIPLE INSTANCE MACHINE LEARNING FOR QUESTION ANSWERING SYSTEMS

BACKGROUND

The present application relates generally to an improved data processing apparatus and method and more specifically to mechanisms for multiple instance machine learning for question answering systems.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples of QA systems are the IBM Watson™ system available from International Business Machines (IBM®) Corporation of Armonk, N.Y., Siri® from Apple®, and Cortana® from Microsoft®. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypotheses based on the decomposed question and results of a primary search of answer sources, performs hypothesis and evidence scoring based on a retrieval of evidence from evidence sources, performs synthesis of the one or more hypotheses, and based on trained models, performs a final merging and ranking to output an answer to the input question along with a confidence measure.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for question answering using multi-instance learning. The method comprises training an answer ranking multi-instance learned model using a ground truth question and answer-key pairs set. The method further comprises receiving a input question from a user and generating one or more candidate answers to the input question. Each of the one or more candidate answers has an associated set of supporting passages. The method further comprises determining a confidence value for each of the one or more candidate answers using the answer ranking multi-instance learned model based on the sets of supporting passages. The method further comprises ranking the one or more candidate answers by confidence value to form a ranked set of answers and presenting a final answer from the ranked set of answers, the confidence value for the final answer, and supporting evidence for the final answer to the user.

In other illustrative embodiments, a computer program product comprising a computer usable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 is a flowchart illustrating operation of a machine learning system for training multi-instance machine learning models for a question answering system in accordance with an illustrative embodiment; and FIG. 8 is a flowchart illustrating operation of a question answering system using multi-instance machine learning models in accordance with an illustrative embodiment.

DETAILED DESCRIPTION

Figure 1:
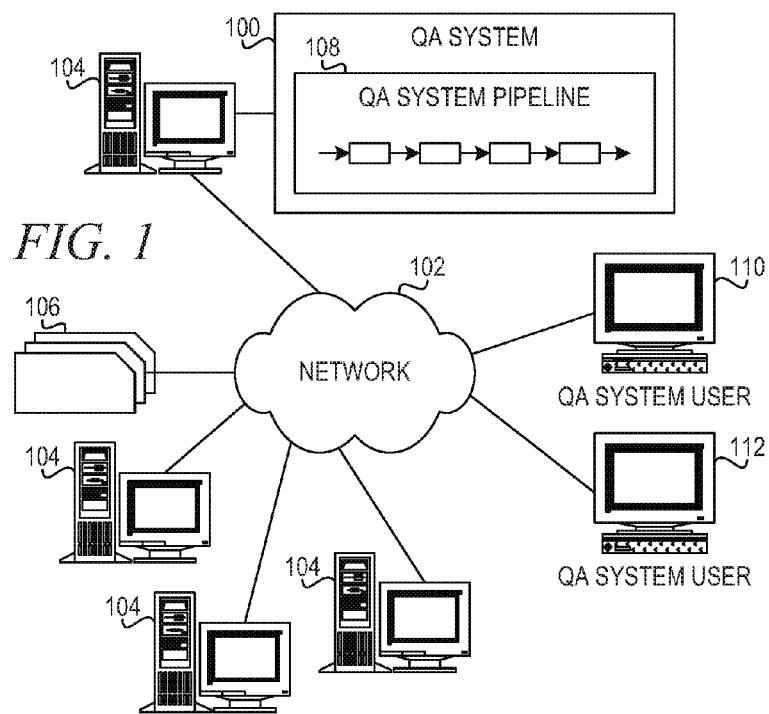
FIG. 1 depicts a schematic diagram of one illustrative embodiment of a question/answer creation (QA) system in a computer network.

Open domain question answering (QA) systems typically rely on the vast amounts (and redundancy) of information available to online search. Broadly speaking, in order to generate an answer to a question, such systems would issue a search query (derived somehow from the question), expected to return a number of documents and passages that might contain an answer. Processing these documents and passages to generate candidate answers may deploy a variety of strategies, depending on both the type of question and the way in which supporting passages have been targeted by the query. The QA system then processes passages to generate candidate answers and evaluates these candidates to determine the most likely to be the answer to the question.

For many question types, including factoid, list, reverse definition, procedure, semantically constrained, and so forth, an enabling assumption is that the answer is somehow embedded in a passage text. For others, exemplified by "yes-no" questions, the assumption does not hold. Still, passages returned by the search have to be assessed by passage scoring components in order to put a number on the extent to which they offer evidence for the candidate answers.

Present day factoid QA systems deploy apposite algorithms developed for search query generation, candidate answer hypothesizing, and supporting passages scoring. However, their high accuracy is additionally, and in no way small extent, due to the amount of unstructured background knowledge available online, and the ability to process that in a focused way. Specifically, additional leverage is provided by the fact that in online sources, there is a huge redundancy: a relevant fact is likely to be stated numerous times, in more or less different ways and contexts. Obviously, for question answering exploiting supporting passages to score candidate answer hypotheses this is a "bonus," which can be—and has been—successfully exploited.

The key to this success lies in the ability to capture an informative sample of features and characteristics of the passages justifying the correct answer. A technical challenge arises from the fact that for any question-answer pair, there will be multiple, and typically numerous, supporting passages for that answer: consequently, particular passage scoring features will typically have different values in each. Training of a classical machine learning model for a classifier to decide if a candidate answer is the correct answer, based on a set of supporting passages for that candidate, requires, in essence, a single feature vector for the multiple supporting passages for any given candidate answer.

In a machine learning approach, this requires the ability to felicitously merge and combine evidence. The particular QA system instance deploys a feature merging step, which reduces the multiple values associated with feature vector labels to a single value, per label, for a given question and generated candidate answer.

In order to handle the variety of passage scoring algorithms and features, an existing system supports different merging policies for each feature (merging policies include, for instance, "max," "min," or "decaying sum").

A common problem with feature merging, however, is that it is impossible to know a priori what the effectiveness and weight of any particular passage is with respect to its support for, or refutation of, the answer.

The illustrative embodiments provide a mechanism for passage scoring that does not require feature merging, thus bypassing the question of determining an optimal merging policy for each passage scoring feature, and potentially better suited to answering "yes-no" questions, where justifying passages are difficult to come up with for training. The mechanism of the illustrative embodiments is compatible with the overall passage scoring framework outlined above and, therefore, reuses many existing algorithms and components. The illustrative embodiments are applicable to different question answering frameworks for different question types, including questions whose answers are longer passages rather than the one or more conventionally assumed (and expected) short expressions. Separately, the illustrative embodiments rely less on the redundancy of the answer being mentioned in different text fragments or on the assumption that the answer will be embedded in a text fragment. This makes for an interesting and useful extension of the conventional QA system pipeline.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
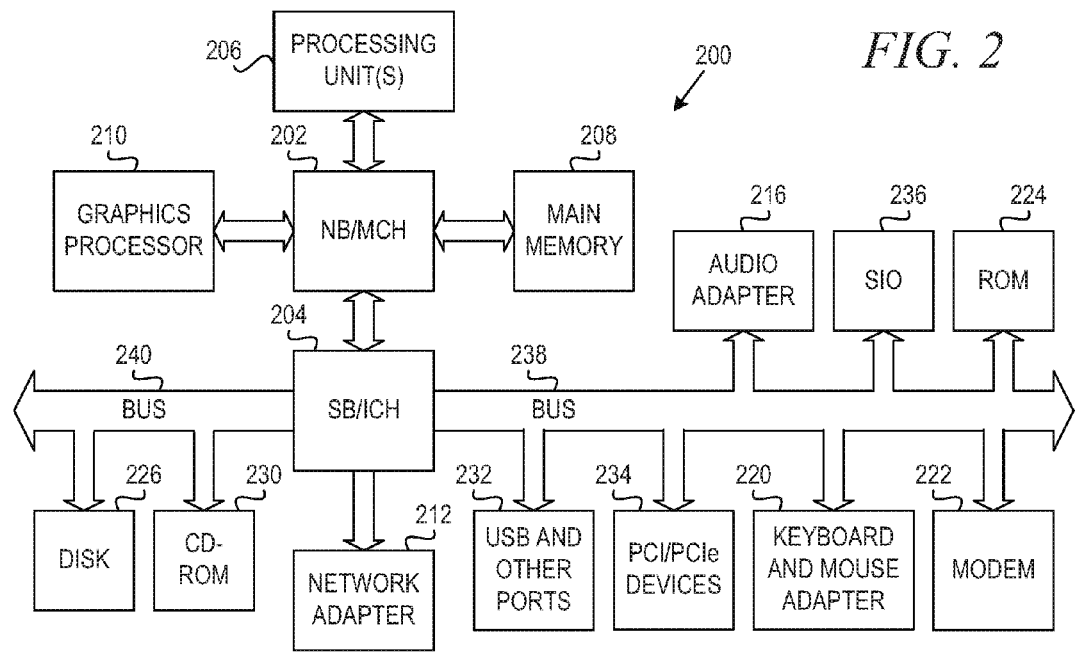
FIG. 2 is a block diagram of an example data processing system in which aspects of the illustrative embodiments are implemented.
Figure 3:
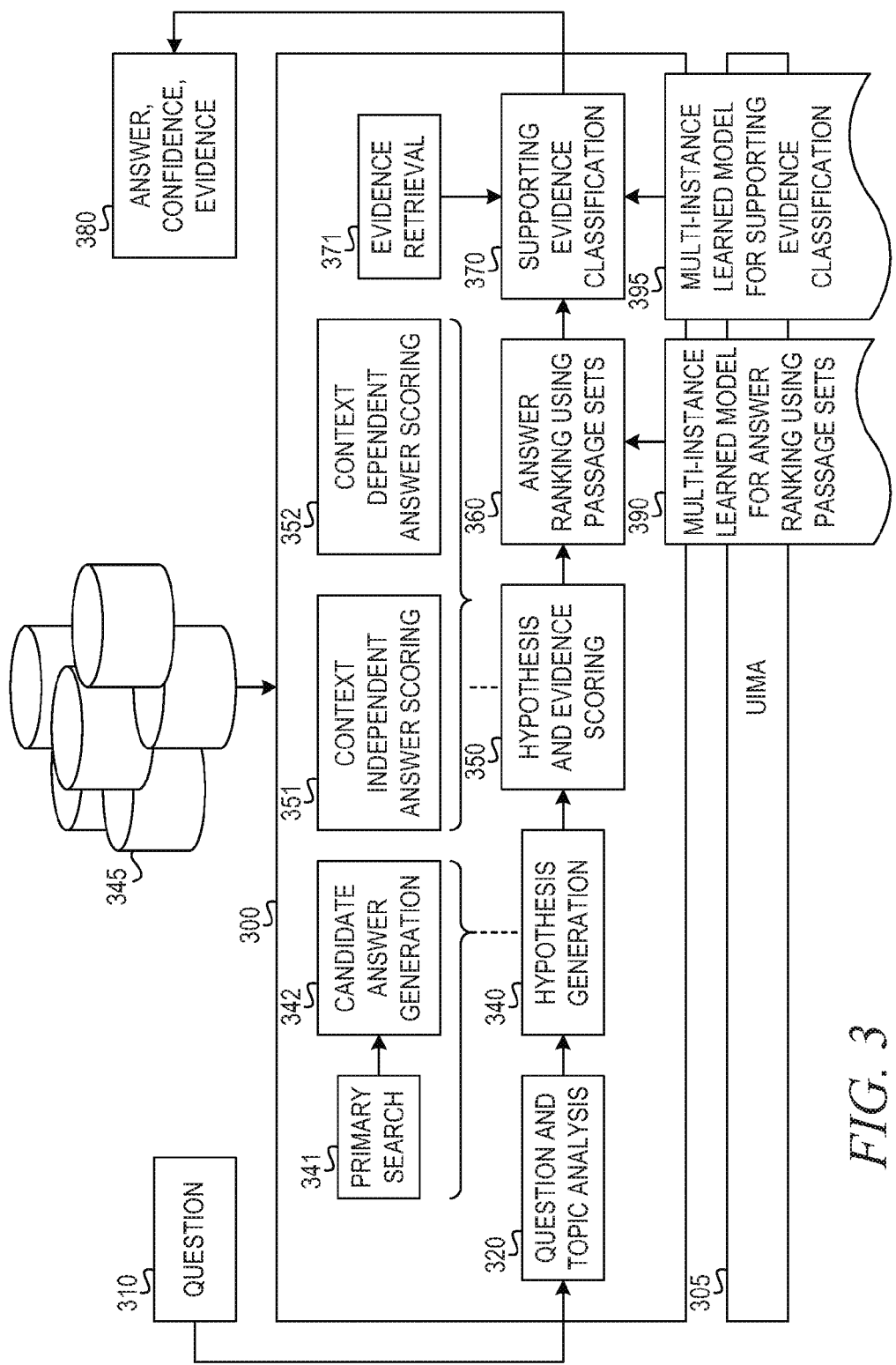
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example Question Answering (QA) system (also referred to as a Question/Answer system or Question and Answer system), methodology, and computer program product with which the mechanisms of the illustrative embodiments are implemented. As will be discussed in greater detail hereafter, the illustrative embodiments are integrated in, augment, and extend the functionality of these QA mechanisms with regard to multiple instance machine learning.

Thus, it is important to first have an understanding of how question and answer creation in a QA system is implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments are implemented. Many modifications to the example QA system shown in FIGS. 1-3 may be implemented in various embodiments of the present invention without departing from the spirit and scope of the present invention.

As an overview, a Question Answering system (QA system) is an artificial intelligence application executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question which are then interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, analyzes the question to extract the major elements of the question, uses the extracted element to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis, e.g., English Slot Grammar (ESG) and Predicate Argument Structure (PAS) builder, on the language of the input question and the language used in each of the portions of the corpus of data found during the application of the queries using a variety of scoring algorithms. There may be hundreds or even thousands of scoring algorithms applied, each of which performs different analysis, e.g., comparisons, natural language analysis, lexical analysis, or the like, and generates a score. For example, some scoring algorithms may look at the matching of terms and synonyms within the language of the input question and the found portions of the corpus of data. Other scoring algorithms may look at temporal or spatial features in the language, while others may evaluate the source of the portion of the corpus of data and evaluate its veracity.

The scores obtained from the various scoring algorithms indicate the extent to which the potential response is likely to be a correct answer to the input question based on the specific area of focus of that scoring algorithm. Each resulting score is then weighted against a statistical model, which is used to compute the confidence that the QA system has regarding the evidence for a candidate answer being the correct answer to the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, etc.). Conventional question answering systems are capable of generating answers based on the corpus of data and the input question, verifying answers to a collection of questions from the corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information usable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enables question/answer (QA) generation functionality for one or more QA system users via their respective computing devices 110-112. Other embodiments of the QA system 100 may be used with components, systems, sub-systems, and/or devices other than those that are depicted herein.

The QA system 100 is configured to implement a QA system pipeline 108 that receive inputs from various sources. For example, the QA system 100 receives input from the network 102, a corpus of electronic documents 106, QA system users, and/or other data and other possible sources of input. In one embodiment, some or all of the inputs to the QA system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes any file, text, article, or source of data for use in the QA system 100. QA system users access the QA system 100 via a network connection or an Internet connection to the network 102, and input questions to the QA system 100 that are answered by the content in the corpus of data 106. In one embodiment, the questions are formed using natural language. The QA system 100 analyzes and interprets the question, and provides a response to the QA system user, e.g., QA system user 110, containing one or more answers to the question. In some embodiments, the QA system 100 provides a response to users in a ranked list of candidate answers while in other illustrative embodiments, the QA system 100 provides a single final answer or a combination of a final answer and ranked listing of other candidate answers.

The QA system 100 implements a QA system pipeline 108 which comprises a plurality of stages for processing an input question and the corpus of data 106. The QA system pipeline 108 generates answers for the input question based on the processing of the input question and the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. As outlined previously, the IBM Watson™ QA system receives an input question which it then analyzes to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of scoring algorithms. The scores obtained from the various scoring algorithms are then weighted against a statistical model that summarizes a level of confidence that the IBM Watson™ QA system has regarding the evidence that the potential response, i.e. candidate answer, is inferred by the question. This process is repeated for each of the candidate answers to generate ranked listing of candidate answers which may then be presented to the user that submitted the input question, or from which a final answer is selected and presented to the user. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developer Works, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage, the QA system receives an input question 310 that is presented in a natural language format. That is, a user inputs, via a user interface, an input question 310 for which the user wishes to obtain an answer, e.g., "Who were Washington's closest advisors?" In response to receiving the input question 310, the next stage of the QA system pipeline 300, i.e. the question and topic analysis stage 320, analyzes the input question using natural language processing (NLP) techniques to extract major elements from the input question, and classify the major elements according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major elements of the question are then used during a hypothesis generation stage 340 to decompose the question into one or more search queries that are applied to the corpora of data/information 345 in order to generate one or more hypotheses. Hypothesis generation stage includes primary search phase 341 and candidate answer generation stage 342. In primary search phase 341, the queries are generated in any known or later developed information retrieval (IR) query language, such as the Indri, Lucene, or the like. The queries are applied to one or more text indexes storing information about the electronic texts, documents, articles, websites, and the like, that make up the corpora of data/information 345. That is, these various sources themselves, different collections of sources, and the like, represent a different corpus within the corpora 345. There may be different corpora defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus within the corpora 345.

The queries are applied to one or more text indexes storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during candidate answer generation 342 in the hypothesis generation stage 340, to generate hypotheses for answering the input question 310. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of scoring algorithms in context independent answer scoring 351 and context dependent answer scoring 352, each performing a separate type of analysis of the language of the input question and/or content of the corpus that provides evidence in support of, or not in support of, the hypothesis. Each scoring algorithm in context independent answer scoring 351 and context dependent answer scoring 352 generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexities may be used to generate scores for candidate answers and evidence without departing from the spirit and scope of the present invention.

In answer ranking stage 360, the scores generated by the various scoring algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonyms may be set relatively higher than other algorithms that evaluate publication dates for evidence passages.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by answer ranking stage 360, which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers").

Supporting evidence collection phase 370 collects evidence from evidence retrieval 371 that supports the candidate answers from answer ranking phase 360. From the ranked listing of candidate answers in stage 360 and supporting evidence from supporting evidence collection stage 370, QA system pipeline 300 generates a final answer, confidence score, and evidence 380, or final set of candidate answers with confidence scores and supporting evidence, and outputs answer, confidence, and evidence 380 to the submitter of the original input question 310 via a graphical user interface or other mechanism for outputting information.

When ranking answers using feature-merging, there is no way to know what exactly the contribution of an individual passage is to ultimately judging whether a candidate answer is or is not the correct answer. This causes some loss in the overall signal, at best. The loss is likely to intensify when the passages are to be viewed as supporting for the correctness of the proposition underlying a non-factoid question.

The illustrative embodiments take advantage of the polar nature of supporting passages, namely, that any passage either justifies or does not justify the candidate answer as the correct answer to the question. On that basis, the QA system reinterprets the set of supporting passages returned by the search component. Then, in a training setting, the QA system builds a model specifically adjusted to the partitioning of the candidate answers (correct or wrong), using the passages returned by the search.

The passage sets are associated with different candidate answers. Without feature merging, the QA system cannot train the model within the traditional passage scoring framework. Still, the QA system knows for any given passage set which of the possible alternate scenarios applies to it as a whole: this set of passages does, or does not, support the candidate answer as being the correct answer. This judgement is based purely on consulting the ground truth and does not rely on or assume textual occurrence of a candidate answer in a passage. Consequently, that passage still is a potential source of features for a learner.

Instead of using feature merging, answer ranking stage 360 retains the individuality of supporting passages as a set of evidence that collectively contributes signal to the learner. Each passage is an instance for a classifier, which labels an entire passage set as supporting or not supporting the correct answer, and even if the learner does not have the instance labels on a per-instance basis, the learner knows the label for the entire set of instances.

Rather than training a supervised learning model from feature vectors derived from passages, multi-instance learned model 390 is trained to perform a different classification task: that of assigning a binary label to a set of supporting passages where the sets do have labels. That is, multi-instance learned model 390 is trained based on whether a passage set returned for a given candidate answer collectively does or does not support a correct answer. Training of multi-instance learned model 390 is described in more detail below with reference to FIG. 7.

The illustrative embodiments propose a shift of granularity of passage assessment and scoring, where on the one hand, passage feature vectors do not get merged (and labeled), and on the other, the feature vectors are for the entire set, containing many passage vectors unlabeled. This shift of granularity repositions the classification task to one more appropriate for multiple instance learning. Given a set of labeled sets of passages associated with each candidate answer, the machine learning system learns how to label sets and, in effect, distinguishes between correct and incorrect answer candidates, without knowing the actual polarity of the individual supporting passages within the sets, resulting in multi-instance learned model 390.

In essence, the illustrative embodiments recast the problem of passage scoring and hypothesis assessment for candidate answers to actually take advantage of the fact that the machine learning system only possesses incomplete knowledge about how training examples should be labeled.

At runtime for a given input question 310, answer ranking stage 360 receives candidate answers with passage sets from hypothesis and evidence scoring stage 350. Answer ranking stage 360 uses multi-instance learned classification model 390 to establish true or false for each candidate answer using a set of feature vectors corresponding to multiple instances of passages that support or refute the candidate answer.

In addition, supporting evidence collection phase 370 builds on the capabilities of multi-instance learning and extends the set of outputs after the pipeline 300 has completed processing. Multi-instance learned model 395 is for instance-level classification. Multi-instance learned model 395 is used to distill what, in the individual passage feature vectors, led to the overall judgement of the polarity of the passage set label. In effect, multi-instance learned model 395 identifies feature vector(s) that contributed to the (correct/ wrong) labeling judgement. Training of multi-instance learned model 395 is described in more detail below with reference to FIG. 7.

Between the two models, 390 and 395, the QA system pipeline 300 has the complementary capabilities for answer ranking in stage 360—delivering an answer with confidence—and passage ranking in stage 370. Thus, supporting evidence collection stage 370 scores the evidence and offers the user justification as appropriate for the candidate answer chosen.

Figure 4:
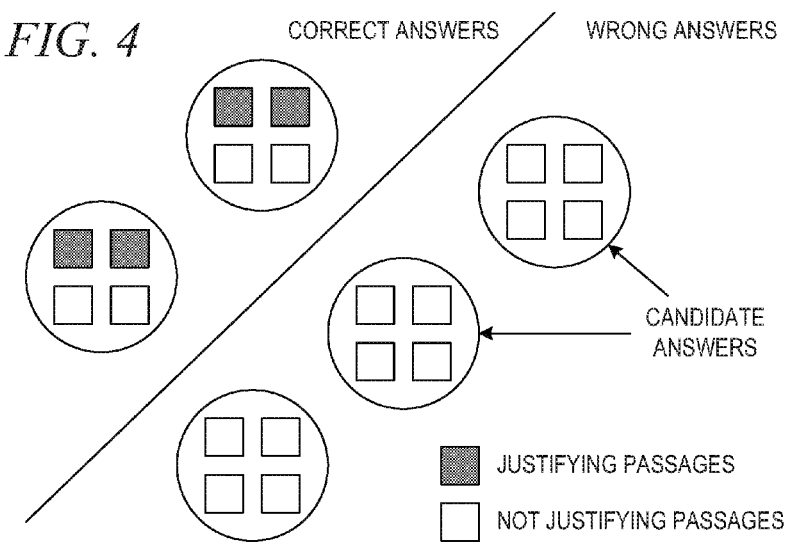
FIG. 4 illustrates sets of passages, either supporting or not, candidate answers in accordance with an illustrative embodiment.

With multi-instance learning classification, the training set consists not of individually labeled instances, but of sets of unlabeled instances together with binary set labels. FIG. 4 illustrates sets of passages supporting or not supporting candidate answers in accordance with an illustrative embodiment. As shown in the depicted example, sets of passages for right answers have one or more passages that justify the answer, while sets of passages for wrong answers do not have passages that justify the answer. A right answer may have any number of justifying passages. In accordance with the illustrative embodiments, a machine learning system trains a multi-instance machine learning model using a binary label to a set of passages, as described below with reference to FIG. 7.

Figure 5:
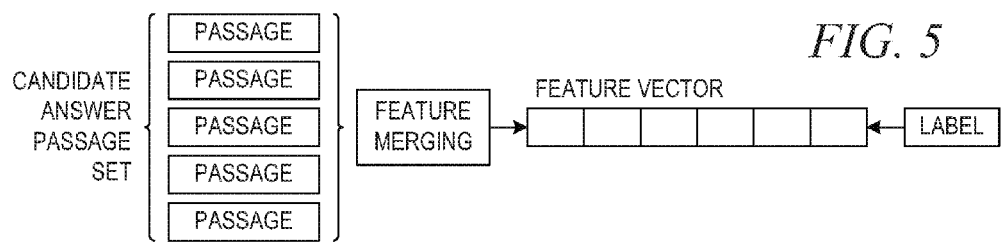
FIG. 5 illustrates assigning labels to passages after feature merging.

FIG. 5 illustrates assigning labels to passages using feature merging. The question answering system generates a given candidate answer based on a candidate answer passage set including a plurality of passages from the corpus. A traditional QA system, using feature merging, generates a feature vector for each passage and then performs feature merging to form a feature vector for the entire candidate answer passage set. The machine learning system then assigns a label to the feature vector.

Figure 6:
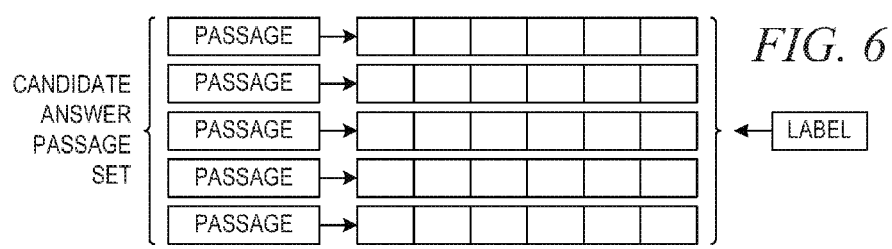
FIG. 6 illustrates assigning labels to sets of passages in a multi-instance machine learning mechanism in accordance with an illustrative embodiment.

FIG. 6 illustrates assigning labels to sets of passages in a multi-instance machine learning mechanism in accordance with an illustrative embodiment. The question answering system generates a given candidate answer based on a candidate answer passage set including a plurality of passages from the corpus. The QA system generates a feature vector for each passage. The multi-instance machine learning model is trained using the ground truth, which contains vetted question-answer pairs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 7 is a flowchart illustrating operation of a machine learning system for training a multi-instance model for answer ranking and a multi-instance model for supporting evidence classification for a question answering system in accordance with an illustrative embodiment. Operation begins (block 700), and the system submits a training question from a question and answer-key pairs set to the question answering (QA) system (block 701), and a candidate answer generation phase of the QA system generates one or more candidate answers (block 702). For each candidate answer generated (block 703), the system receives a passage set for the given candidate answer (block 704). The system uses passage scorers to form a feature vector for each passage in the passage set (block 705). The system labels the entire passage set as true or false based on whether the passages support a correct or wrong answer to the question based on whether the candidate answer is the same as the vetted answer in the ground truth question and answer-key pair (block 706).

The system determines whether there are more answers generated by the candidate answer generation phase of the QA system for the submitted training question (block 707). If there is another candidate answer to consider, then operation returns to block 703 to consider the next candidate answer for the current training question. If there are no more candidate answers generated for the submitted training question in block 707, then the system determines whether the current training question is the last training question in the question and answer-key pairs set (block 708). If the current training question is not the last training question, then operation returns to block 701 to submit the next training question from the question and answer-key pairs set to the QA system. If the current training question is the last training question in the question and answer-key pairs set in block 708, then the system trains the multi-instance model for answer ranking and the multi-instance model for supporting evidence classification (block 709), and operation ends (block 710).

FIG. 8 is a flowchart illustrating operation of a question answering system using multi-instance machine learned models in accordance with an illustrative embodiment. Operation begins (block 800), and a user submits a question to the question answering system (block 801). The system generates one or more candidate answers (block 802). For each candidate answer generated by a candidate answer generation phase of the QA system (block 803), the answer ranking stage of the QA system receives a passage set for the given candidate answer (block 804) and uses passage scorers to form a feature vector for each passage in the passage set (block 805).

The QA system determines whether there are more candidate answers generated for the question (block 806). If there are more candidate answers, then operation returns to block 803 to consider the next candidate answer. If there are no more candidate answers to consider for the submitted question in block 806, then the QA system determines final confidence values for the candidate answers based on a multi-instance learned model for answer ranking (learned in block 709 of FIG. 7) using the feature vectors for the passage sets (block 807). The QA system then ranks the candidate answers by confidence value (block 808). The QA system then classifies supporting evidence passages using the multi-instance learned model for supporting evidence classification (block 809) (learned in block 709 of FIG. 7). Thereafter, the QA system presents the top answer(s), confidence value (s), and supporting evidence to the user (block 810), and operation ends (block 811).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide a mechanism for passage scoring that does not require feature merging, thus bypassing the question of determining an optimal merging policy for each passage scoring feature, where justifying passages are difficult to come up with for training. The mechanism of the illustrative embodiments is compatible with the overall passage scoring framework outlined above and, therefore, reuses many existing algorithms and components. The illustrative embodiments are applicable to different question answering frameworks for different question types, including questions whose answers are longer passages rather than the one or more conventionally assumed (and expected) short expressions. Separately, the illustrative embodiments rely less on the redundancy of the answer being mentioned in different text fragments or on the assumption that the answer will be embedded in a text fragment. This makes for an interesting and useful extension of the conventional QA system pipeline.

A first multi-instance learned model is trained based on whether a passage set returned for a given candidate answer collectively does or does not support a correct answer. A second multi-instance learned model is for instance-level classification and tries to distill what, in the individual passage feature vectors, led to the overall judgement of the polarity of the passage set label. Between the two models, the QA system pipeline has the complementary capabilities for answer ranking and passage ranking. A supporting evidence collection stage scores the evidence and offers the user justification as appropriate for the candidate answer chosen.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions executed by the at least one processor to cause the at least one processor to implement a question answering system, for question answering using multi-instance learning, the method comprising:

training an answer ranking multi-instance learned model using a ground truth question and answer-key pairs set, wherein the data processing system executes in accordance with the answer ranking multi-instance learned model to implement the question answering system, wherein the answer ranking multi-instance learned model is trained by labeling each passage set returned for each correct answer as true responsive to determining the passage set collectively does support a correct answer according to the question and answer-key pairs set and labeling each passage set returned for an incorrect answer as false responsive to determining the passage set collectively does not support a correct answer according to the question and answer-key pairs set;

receiving, by the question answering system, an input question from a user;

generating, by a hypothesis generation phase of a question answering pipeline of the question answering system, one or more candidate answers to the input question, wherein each of the one or more candidate answers has an associated set of supporting passages;

determining, by a hypothesis and evidence scoring phase of the question answering pipeline of the question answering system, a confidence value for each of the one or more candidate answers by applying the answer ranking multi-instance learned model to the associated sets of supporting passages;

ranking, by an answer ranking phase of the question answering pipeline of the question answering system, the one or more candidate answers by confidence value to form a ranked set of answers; and presenting, by the question answering system, a final answer from the ranked set of answers, the confidence value for the final answer, and supporting evidence for the final answer to the user.

2. The method of claim 1, wherein determining the confidence value for each of the one or more candidate answers comprises:

receiving a set of passages for a given candidate answer;

using passage scorers to form a feature vector for each passage in the set of passages to form a set of feature vectors; and determining the confidence value for the given candidate answer by applying the answer ranking multi-instance learned model to the sets of feature vectors.

3. The method of claim 1, wherein training the answer ranking multi-instance learned model comprises:

generating one or more candidate answers for each given training question in the ground truth question and answer-key pairs set;

receiving a set of passages for each of the one or more candidate answers;

using passage scorers to form a feature vector for each passage in the set of passages to form a set of feature vectors for each of the one or more candidate answers;

labeling each set of feature vectors based on whether the corresponding candidate answer is the same as a vetted correct answer in the ground truth question and answer-key pairs set; and training the answer ranking multi-instance learned model based on the labeling of the sets of feature vectors.

4. The method of claim 1, further comprising training an evidence collection multi-instance learned model using the ground truth question and answer-key pairs set.

5. The method of claim 4, further comprising:

collecting a set of supporting evidence passages for the final answer;

using passage scorers to form a feature vector for each passage in the set of supporting evidence passages to form a set of feature vectors; and ranking the set of supporting evidence passages for the final answer using the evidence collection multi-instance learned model to form a ranked set of supporting evidence passages.

6. The method of claim 5, wherein presenting a final answer from the ranked set of answers comprises presenting at least one supporting evidence passage from the ranked set of supporting evidence passages with the final answer.

7. The method of claim 4, wherein evidence collection multi-instance learned model identifies feature vectors that contribute to a labeling judgement.

8. A computer program product comprising a computer readable storage medium having a computer readable program stored therein, wherein the computer readable program, when executed on a computing device, causes the computing device to implement a question answering system, for question answering using multi-instance learning, wherein the computer readable program causes the computing device to:

train an answer ranking multi-instance learned model using a ground truth question and answer-key pairs set, wherein the data processing system executes in accordance with the answer ranking multi-instance learned model to implement the question answering system, wherein the answer ranking multi-instance learned model is trained by labeling each passage set returned for each correct answer as true responsive to determining the passage set collectively does support a correct answer according to the question and answer-key pairs set and labeling each passage set returned for an incorrect answer as false responsive to determining the passage set collectively does not support a correct answer according to the question and answer-key pairs set;

receive, by the question answering system, an input question from a user;

generate, by a hypothesis generation phase of a question answering pipeline of the question answering system, one or more candidate answers to the input question, wherein each of the one or more candidate answers has an associated set of supporting passages;

determine, by a hypothesis and evidence scoring phase of the question answering pipeline of the question answering system, a confidence value for each of the one or more candidate answers by applying the answer ranking multi-instance learned model to the associated sets of supporting passages;

rank, by an answer ranking phase of the question answering pipeline of the question answering system, the one or more candidate answers by confidence value to form a ranked set of answers; and present, by the question answering system, a final answer from the ranked set of answers, the confidence value for the final answer, and supporting evidence for the final answer to the user.

9. The computer program product of claim 8, wherein determining the confidence value for each of the one or more candidate answers comprises:

receiving a set of passages for a given candidate answer;

using passage scorers to form a feature vector for each passage in the set of passages to form a set of feature vectors; and determining the confidence value for the given candidate answer by applying the answer ranking multi-instance learned model to the sets of feature vectors.

10. The computer program product of claim 8, wherein training the answer ranking multi-instance learned model comprises:

generating one or more candidate answers for each given training question in the ground truth question and answer-key pairs set;

receiving a set of passages for each of the one or more candidate answers;

using passage scorers to form a feature vector for each passage in the set of passages to form a set of feature vectors for each of the one or more candidate answers;

labeling each set of feature vectors based on whether the corresponding candidate answer is the same as a vetted correct answer in the ground truth question and answer-key pairs set; and training the answer ranking multi-instance learned model based on the labeling of the sets of feature vectors.

11. The computer program product of claim 8, wherein the computer readable program further causes the computing device to train an evidence collection multi-instance learned model using the ground truth question and answer-key pairs set.

12. The computer program product of claim 11, wherein the computer readable program further causes the computing device to:

collect a set of supporting evidence passages for the final answer;

use passage scorers to form a feature vector for each passage in the set of supporting evidence passages to form a set of feature vectors; and rank the set of supporting evidence passages for the final answer using the evidence collection multi-instance learned model to form a ranked set of supporting evidence passages.

13. The computer program product of claim 12, wherein presenting a final answer from the ranked set of answers comprises presenting at least one supporting evidence passage from the ranked set of supporting evidence passages with the final answer.

14. The computer program product of claim 11, wherein evidence collection multi-instance learned model identifies feature vectors that contribute to a labeling judgement.

15. An apparatus comprising:

a processor; and a memory coupled to the processor, wherein the memory comprises instructions which, when executed by the processor, cause the processor to implement a question answering system, for question answering using multi-instance learning, wherein the instructions cause the processor to:

train an answer ranking multi-instance learned model using a ground truth question and answer-key pairs set, wherein the data processing system executes in accordance with the answer ranking multi-instance learned model to implement the question answering system, wherein the answer ranking multi-instance learned model is trained by labeling each passage set returned for each correct answer as true responsive to determining the passage set collectively does support a correct answer according to the question and answer-key pairs set and labeling each passage set returned for an incorrect answer as false responsive to determining the passage set collectively does not support a correct answer according to the question and answer-key pairs set;

receive, by the question answering system, an input question from a user;

generate, by a hypothesis generation phase of a question answering pipeline of the question answering system, one or more candidate answers to the input question, wherein each of the one or more candidate answers has an associated set of supporting passages;

determine, by a hypothesis and evidence scoring phase of the question answering pipeline of the question answering system, a confidence value for each of the one or more candidate answers by applying the answer ranking multi-instance learned model to the associated sets of supporting passages;

rank, by an answer ranking phase of the question answering pipeline of the question answering system, the one or more candidate answers by confidence value to form a ranked set of answers; and present, by the question answering system, a final answer from the ranked set of answers, the confidence value for the final answer, and supporting evidence for the final answer to the user.

16. The apparatus of claim 15, wherein determining the confidence value for each of the one or more candidate answers comprises:
receiving a set of passages for a given candidate answer;
using passage scorers to form a feature vector for each passage in the set of passages to form a set of feature vectors; and
determining the confidence value for the given candidate answer by applying the answer ranking multi-instance learned model to the sets of feature vectors.

17. The apparatus of claim 15, wherein training the answer ranking multi-instance learned model comprises:
generating one or more candidate answers for each given training question in the ground truth question and answer-key pairs set;
receiving a set of passages for each of the one or more candidate answers;
using passage scorers to form a feature vector for each passage in the set of passages to form a set of feature vectors for each of the one or more candidate answers;
labeling each set of feature vectors based on whether the corresponding candidate answer is the same as a vetted correct answer in the ground truth question and answer-key pairs set; and
training the answer ranking multi-instance learned model based on the labeling of the sets of feature vectors.

18. The apparatus of claim 15, wherein the instructions further cause the processor to train an evidence collection multi-instance learned model using the ground truth question and answer-key pairs set.

19. The apparatus of claim 18, wherein the instructions further cause the processor to:
collecting a set of supporting evidence passages for the final answer;
using passage scorers to form a feature vector for each passage in the set of supporting evidence passages to form a set of feature vectors; and
ranking the set of supporting evidence passages for the final answer using the evidence collection multi-instance learned model to form a ranked set of supporting evidence passages.

20. The apparatus of claim 19, wherein presenting a final answer from the ranked set of answers comprises presenting at least one supporting evidence passage from the ranked set of supporting evidence passages with the final answer.

* * * * *